(12) United States Patent
Larroche et al.

(10) Patent No.: US 10,815,018 B2
(45) Date of Patent: Oct. 27, 2020

(54) METHOD AND SYSTEM FOR DEEP VACUUM PACKAGING OF A FOOD PRODUCT WITHOUT COVERING LIQUID

(71) Applicant: SODETECH, La Teste de Buch (FR)

(72) Inventors: Jean Larroche, Pujols (FR); Brigitte Larroche, Paris (FR)

(73) Assignee: SODETECH, La Teste de Buch (FR)

( * ) Notice: Subject to any disclaimer, the term of this patent is extended or adjusted under 35 U.S.C. 154(b) by 757 days.

(21) Appl. No.: 15/193,065

(22) Filed: Jun. 26, 2016

(65) Prior Publication Data

US 2017/0001739 A1  Jan. 5, 2017

(30) Foreign Application Priority Data

Jun. 30, 2015  (FR) ...................................... 15 56120

(51) Int. Cl.
| | |
|---|---|
| B65B 31/02 | (2006.01) |
| B65B 55/02 | (2006.01) |
| A23L 3/10 | (2006.01) |
| A23B 7/00 | (2006.01) |
| A23B 4/00 | (2006.01) |
| B65B 7/28 | (2006.01) |

(Continued)

(52) U.S. Cl.
CPC .............. *B65B 31/028* (2013.01); *A23B 4/00* (2013.01); *A23B 7/00* (2013.01); *A23L 3/00* (2013.01); *A23L 3/10* (2013.01); *B65B 7/2821* (2013.01); *B65B 7/2842* (2013.01); *B65B 25/001* (2013.01); *B65B 31/027* (2013.01); *B65B 55/02* (2013.01); *A23V 2002/00* (2013.01); *B65B 55/14* (2013.01); *B65B 63/08* (2013.01)

(58) Field of Classification Search
CPC ... B65B 31/028; B65B 31/027; B65B 7/2821; B65B 7/2842; B65B 25/001; B65B 55/02; A23B 4/00; A23B 7/00; A23L 3/00; A23L 3/10; A23V 2002/00
See application file for complete search history.

(56) References Cited

U.S. PATENT DOCUMENTS 3,258,345 A * 6/1966 Schack ................ A23B 4/0235
426/266

FOREIGN PATENT DOCUMENTS

| EP | 0 019 646 A1 | 12/1980 |
|---|---|---|
| EP | 1 421 001 A1 | 5/2004 |
| FR | 2 686 059 A1 | 7/1993 |

* cited by examiner

*Primary Examiner* — Erik Kashnikow
*Assistant Examiner* — Lela S. Williams
(74) *Attorney, Agent, or Firm* — Im IP Law; Chai Im; C. Andrew Im (57) ABSTRACT

A method for deep vacuum packaging of a food product and a system for implementing this method. The food product and at least one additive are placed in a mixing device. The mixing device is evacuated and its contents are mixed to ensure a penetration of the additive(s) in the food product and to outgas the mixture until an absolute pressure is less than or equal to 30 mbar. The temperature of the food product is less than the boiling temperature of the liquid and the additives contained therein at a particular pressure. At least a portion of the mixture cold blanched is packaged in a tight container. The container is optionally pasteurised/ sterilized in a short time by controlling the pressure and temperature conditions such that the container does not open or become crushed under the effect of a pressure difference between the inside of the container and the autoclave.

15 Claims, 2 Drawing Sheets

(51) Int. Cl.
*A23L 3/00* (2006.01)
*B65B 25/00* (2006.01)
*B65B 63/08* (2006.01)
*B65B 55/14* (2006.01)

METHOD AND SYSTEM FOR DEEP VACUUM PACKAGING OF A FOOD PRODUCT WITHOUT COVERING LIQUID

RELATED APPLICATIONS

This application claims priority from French Patent Application No. 15 56120 filed Jun. 30, 2015, each of which is incorporated herein by reference in its entirety.

BACKGROUND OF THE INVENTION

Field of the Invention

The present invention is in the field of packaging, more particularly the vacuum packaging of foodstuffs in a rigid container.

Its subject matter is a method and a system for the vacuum closure of such a container and the vacuum preservation of foodstuffs without covering liquid. Its subject matter is likewise a method for the sterilization or the pasteurization of foodstuffs which are vacuum packed in such a container.

Technological Background

Canning processes, historically important, are being progressively replaced in part by deep freezing processes in the food industry, due to the organoleptic and nutritional drawbacks of canning which, owing to the presence of substantial covering liquid in the containers, result in overcooking of the food which cannot be cooled quickly enough.

In the prior art, manufacturers reserve metallic packaging for foodstuffs having little or no added value or those whose transport and distribution require more crude methods of preservation, especially in countries where the cold chain and deep freezing are nonexistent.

Even so, progress has been made with vacuum metallic packaging, certainly, with limited vacuum degrees.

Thus, methods of preservation of foodstuffs under vacuum inside rigid containers closed by likewise rigid covers are known.

However, problems persist, such as those involving the closure of the container, its behaviour at the time of sterilization, the poor organoleptic and nutritional qualities obtained for the foods, the substantial weight of these containers after closure and due to the presence of a covering liquid, or even the later opening of these containers, which may constitute a danger to the health of the end user.

According to the known and currently employed methods, the cover is fixed to the mouth of the container by crimping or by folding of jaws of the cover underneath a flange at the mouth of the container.

When the cover is fixed to the container by crimping, the means of opening the container are commonly formed by an element for grasping the cover by the user, either to break the connection between the cover and the container or to tear the cover by shearing along a breaking path which it contains.

One problem posed by this technique lies in the disadvantages connected with the structure of the means used for closing the container. These means in fact involve a restrictive and difficult operation for the consumer, who is even subject to a risk of injury.

Furthermore, and especially in the case of a fixation by crimping of the cover on the container, the mouth of the container is not totally released, which involves difficulties of access by the user to the foodstuffs contained in it.

This is why the idea has been proposed to employ the creation of a vacuum in the container in order to hold the cover naturally in place by a decreased pressure, taking advantage of the pressure difference between the inside of the container and the atmospheric pressure.

In this regard, one could refer in particular to the document FR 2 686 059 A1 which makes mention of such a method of fixation.

It appears that the operation involving placing the interior volume of the container under a vacuum and closing it by the cover is still difficult to carry out.

Document FR 2 686 059 A1 mentions the possibility of placing a vent in the cover to allow the escape of air from the container when placing it under vacuum.

This vent is then blocked by a slug, before placing the container hermetically sealed by the cover under atmospheric pressure.

However, document FR 2 686 059 A1 remains speculative in regard to the means allowing such an operation to be carried out.

Document EP0019646 A1 proposes an installation for the vacuum closure of cans with a cover, involving a first step of blocking the cover on the mouth of the can by the vacuum produced in an enclosure, and a second step of crimping the cover in another enclosure.

On the one hand, this document does not teach the use of a vacuum in the preservation process. On the other hand, the crimping technique makes it troublesome to open the can.

One of the most important issues in the preservation of foodstuffs in cans is, however, posed by the presence of a covering liquid, which is used to protect these products from oxidation.

In fact, one finds that these liquids tend to dilute the soluble substances of the food products so preserved, such as minerals, flavours, and vitamins.

Moreover, these covering liquids which often weigh as much as the food products can cost as much as the packaging, which is particularly true of the fats used during the packaging of confits. These covering liquids need to be recovered and recycled as well, which generates major excess costs.

Furthermore, these liquids generally take a long time to heat and cool, thus significantly increasing the cooking time of the foodstuffs bathed in these liquids during their sterilization or pasteurization.

The result is an overcooking of these products, the effect of which is to destroy the vitamins, but also to produce a health risk in the long term for consumers.

Another problem generally posed in the field of placing food containers under vacuum lies in the methods for this evacuation. This evacuation needs to be organized so as to ensure a total elimination of incondensable gases and especially oxygen, these elements having the effect of altering the content, both in taste and in colour. It is likewise essential to modulate the course of the evacuation to avoid changing the texture of the food (bursting of cells during abrupt evacuation).

Moreover, an operation of pasteurization or sterilization may be scheduled after the vacuum closure of the container. Document FR 2 686 059 A1 mentions the possibility of sterilizing or pasteurizing the container after its closure by reduced pressure.

However, it turns out generally speaking that the use of the technique of vacuum preservation of foods in a rigid container remains difficult, both in regard to the mechanical closure of the container and in regard to the conditions of evacuation of the foods, on the one hand, and the maintaining of a sufficient vacuum for a sufficiently long time to satisfy the users, on the other hand.

Thus, the general purpose of the present invention is to propose means for the durable vacuum preservation of food products in a rigid container, which help to solve the aforementioned problems.

The present invention thus concerns a method for packaging and a system for implementing this method, being simple in their design and their operating mode, allowing the vacuum preservation of food products, especially in piece form, for longer periods than those found at present, without deterioration of the qualities, especially organoleptic qualities, of these products, sparing an overcooking which also results from the surplus of covering liquids, which latter also cause an excess weight of the finished preserves.

Another purpose of the invention is to propose ways of using such a container held closed by reduced pressure, for a subsequent treatment by sterilization or pasteurization of the foods contained therein, this treatment not causing an overcooking of the foods.

Yet another purpose of the present invention is a method for packaging a food product making it possible to lighten the final weight of the container thanks to the absence of covering liquid.

OBJECT AND SUMMARY OF THE INVENTION

To this end, the invention concerns a method for packaging of a food product.

According to the invention, one carries out the following successive steps:
  a) place this food product and one or more additives in a mixing device,
  b) evacuate this mixing device and mix its contents on the one hand to ensure a penetration of the additive(s) in the food product and on the other hand to outgas the mixture so formed, until an absolute pressure less than or equal to 30 mbars is reached,
  c) package at least a portion of the mixture cold blanched in this way in at least one container.

As an illustration, this food product is a product in piece form.

Advantageously, the additive(s) are chosen from the group comprising stabilizers, colourants, spices, flavourings, condiments, water, oils, and combinations of these elements.

The method of the present invention, in addition to innovative improvements made with respect to the teaching of the patent application EP 1 421 001 A1 in the name of the present applicant in the area of the outgassing of food products and in the initial vacuum degree, also provides particular methods of pasteurization or sterilization and refrigeration of such a container held closed by reduced pressure, so as to limit the impact on the texture of the foods, such as the gradualness of the pressure changes in the container.

The notion of a deep vacuum is a relative notion connected to the temperature of the product during the closure of the container and its subsequent temperature of preservation. However, one defines the deep vacuum here as being a partial pressure level of oxygen of at most 10 mbars inside the container at the end of the process, measured at 4° C., the pressure level which one desires to maintain for three years from packaging.

Given the leakage rate, albeit infinitesimal, of the seals used in commerce, and given the appearance of certain gases during the cooking of foods rich in protein and sugar, such as carbonic gas (Strecker degradation), it is necessary for the level of outgassing of the product accomplished during step b), as well as in step c) during a vacuum packaging, to be below 30 mbars of absolute air pressure, and for certain foods below 15 mbars of absolute air pressure, in order to guarantee a deep vacuum level inside the container at the end of the process and for a duration of at least three years.

Experiments carried out with the method which is the object of the present invention have shown that if one places seven hundred and fifty (750) grams of a moist product in the presence of thirty five (35) grams of liquid water, both being at a temperature of forty degrees Celsius (40° C.), and subjects this combination so obtained to an absolute pressure in the order of twenty four (24) mbars, starting from an initial atmospheric pressure, one lowers its temperature below fifteen degrees Celsius (15° C.) due to the rapid and complete evaporation of the thirty five grams (35 g) of water which consumes 542 kcal/g of evaporated water, the quantity of heat surrendered by the product itself which commences homogeneous boiling and induces a supplemental and homogeneous cooling of the whole. One thus obtains a complete outgassing of said product.

With the method according to the invention, one achieves a better preservation of the food products and their elements, such as the vitamins, which do not have to undergo the alteration of the residual oxygen usually contained in the products packaged by the prior art techniques, and mineral salts, which tend to become diluted in the covering liquids.

For example, by placing a can of green beans under vacuum, being heavily loaded with proteins and consequently sensitive to Maillard reactions, if one attains during the packaging step an absolute pressure of 15 mbars, of which around 3 mbars is partial oxygen pressure and 12 mbars is partial nitrogen pressure, one observes upon cooking an outgassing resulting through Strecker degradations in the production of carbon dioxide and the absolute pressure resulting in the can may reach 57 mbars of total pressure, of which 42 mbars of pressure results from the carbon dioxide, an inert gas to the content of the can, and 3 mbars of partial oxygen pressure and 12 mbars of partial nitrogen pressure.

This very slight quantity of remaining oxygen is no problem for the majority of food products which require a slight oxidation to improve the development of their flavours. For example, it is known that, thanks to this slight oxidation, butter takes on a hazelnut taste, wines get better, cheese, pâté, and fish go slightly stale to meet the taste criteria of the end consumer. In the end, the remaining oxygen disappears during these biochemical transformations.

This method also makes it possible, in the case of products in piece form with reduced added moisture, such as around 3% by weight of the total net weight, especially for green beans, peas, corn or similar foodstuffs, to reduce significantly the time of sterilization or pasteurization, thanks to the fact that all the heat exchanges occur through saturating steam pressure, and one therefore benefits from the changes of liquid/vapour phase (latent heat of evaporation/condensation of water=542 kcal/g) which accelerate the heat transfers between the foods, the walls of the can, and the sterilization autoclave.

For products such as foie gras, pâtés or the like, and fish, which form a solid block whose inside is not accessible to the saturating steam and which is thus heated solely by conduction, this method, due to the very deep vacuum produced prior to their packaging thanks to the vacuum mixing device, also makes it possible to shield the products from the pressures usually prevailing in the containers at the time of sterilization, which brings the following advantages:

a limitation of the bleeding of fats, and thus a limitation of the loss in net weight of the packaged product during the sterilization, improvement in the creaminess of the product and thus its quality, for products such as duck confit or the like, easier penetration of the oil or covering liquid, for products such as fish packed in oil or the like, less darkening of the surface of the product, resulting from an oxidation usually caused by the residual oxygen contained in the packages of the prior art.

Moreover, for dry products such as nuts, the experiments proved that the deep evacuation, even without heat treatment, made it possible to obtain a bactericidal effect against aerobic bacteria, which are very plentiful on shelled nuts, as well as against all nonsporulated bacteria, by bursting of cells whose cytoplasm begins to boil under the effect of the pressure drop.

Finally, the same bactericidal effect has been observed in moist products, which explains why the method of the present invention makes it possible to significantly reduce the time of sterilization in the autoclave, by lowering of the initial bacterial burden.

Packaging step c) can be carried out with evacuation, as described below. Alternatively, such a packaging can be done at ambient pressure, the breaking of the vacuum at the end of step b) then being done by introducing, for example, an inert gas for the mixing, such as nitrogen ($N_2$), making it possible to saturate the latter and to avoid any oxidation of the mixture cold blanched in this way during its packaging.

In different particular embodiments of this method, each one having its particular advantages and being susceptible of many possible technical combinations:

in step a), said food product and the additive(s) are placed in a churn outfitted with an evacuating device.

Of course, this could be any other blending device or blender.

Advantageously, this churn has a device to regulate its speed of rotation so as to adjust this speed of rotation depending on the nature of the food product to be packaged.

More generally, the mixing device has a regulating device in order to adjust the mixing speed depending on the nature of the food product.

This mixing device can further comprise a system for introduction of an inert gas making it possible to saturate the mixture cold blanched in this way for the purpose of a packaging of this mixture outside of a high vacuum, such as at atmospheric pressure. Such a system of introduction advantageously comprises one or more orifices placed on the enclosure of said mixing device, one or more valves to open or lock said orifice(s), as well as a gas supply circuit which can be disconnected from said enclosure during step b).

step b) is carried out for a minimum time t ensuring the destruction of the majority of the nonsporulated bacterial burden peculiar to each food product, before step b) the temperature of the food product is at a temperature greater than the boiling temperature of water for the evacuation pressure, at the end of step b) the mixture so formed is at an absolute pressure between 10 and 25 mbars, for one or more fragile ingredients or additives, for example because it is or they are more volatile, before being added during step c), one introduces, prior to this latter step, this or these ingredients or additives alone into said mixing device and outgasses this or these elements alone down to an absolute pressure less than or equal to 30 mbars, these having been previously placed at a temperature lower than +10° C., and even better between −1° C. and +5° C., in order to prevent the volatilization of certain constituents of aromatic function.

Merely as an illustration, this might be diacetyl in butter.

More generally, the temperature in step b) is controlled so that the food product and the liquids surrounding it reach at the end of the outgassing a temperature lower than the boiling temperature of all the ingredients making up or surrounding the product, which are likely to enter into boiling and become evaporated during the evacuation process.

this method includes a step of cooling down of this food product prior to the end of step b).

This cooling down step of the food product is carried out before introducing it into said mixing device and/or during the mixing step in the mixing device.

This mixing device may comprise, for example, means of cooling such as a refrigeration circuit in which a refrigerant fluid is circulating, especially cold water.

in step c), said mixture being at a temperature less than the boiling temperature of water at the pressure used for vacuum packaging of this mixture, one vacuum packages at least a portion of the mixture cold blanched in this way in at least one container.

Preferably, in step c), after introducing at least a portion of said mixture in at least one rigid container, a water-based impregnation liquid is added in each container, the quantity of impregnation liquid added being equal to only the quantity required to form a saturating vapour atmosphere in each container so as to ensure heat exchanges by evaporation or condensation at the absolute pressure prevailing in each container after its closure.

The quantity of water-based impregnation liquid added is thus strictly less than the quantity of liquid needed to form a covering liquid for the contents of the corresponding container.

Preferably, the liquid so added represents less than fifteen percent (15%) by weight, and even better less than five percent (5%) by weight of the total weight of the portion so introduced into each container.

Advantageously, having introduced an identical or essentially identical portion of this mixture into a plurality of rigid containers, which define a batch, one introduces into at least one of these containers one or more measurement devices to define one or more control containers, each measurement device comprising means of communication to put out the measurement(s) performed in the form of communication signals, and having placed said batch in an enclosure, one also introduces into this enclosure, which is connected to means for reducing its pressure, one or more measurement devices comprising means of communication to put out the measurement(s) performed in the form of communication signals, so as to determine in real time the differential pressure and the temperature in each container of said batch and thus enable the monitoring of the packaging of this batch.

Purely as an illustration, these means of communication are wireless means of communication putting out wireless communication signals.

Of course, in a particular embodiment, these means of communication can put out and receive communication signals.

each container being a rigid container, in step c) one performs the following steps:

a) for each container comprising at least one such portion, place this container with a cover having a tightness seal in an enclosure connected to means for reducing its pressure,
b) maintain the cover away from the orifice of the corresponding container by magnetic means so as to allow the escape of gases contained in this container,
c) progressively place the enclosure under vacuum to ensure an evacuation of the container to an absolute pressure less than or equal to 30 mbars, this progressivity being determined according to the aforesaid absolute pressure value and the nature of the content of this container,
d) place the cover over the opening of the container so as to compress its tightness seal against the orifice of the container, place the enclosure at atmospheric pressure, then release the pressure exerted on the cover, the connection between the magnetic means and the cover being broken.

having hermetically closed a given container with a cover by reduced pressure, one performs the following supplemental steps:

bring the content of this container up to a heat treatment temperature greater than or equal to a threshold temperature of pasteurization or sterilization for an exposure time T while continually checking, on the one hand, the temperature and the pressure prevailing in this container, and on the other hand the pressure around this container, so as to prevent any early opening thereof during the heat treatment and any degradation of the structure of said portion contained in this container and/or of the container itself, then cool its contents to a temperature below the cooking temperature of the food product.

Advantageously, one notes that the exposure time T is less, even much less, than the current standards in the industry for the same sterilization value achieved.

Preferably, the cooling down of its contents is achieved by exposing the container to at least one jet of a cooling liquid, preferably immediately at the end of the exposure time T.

Advantageously, this cooling down is achieved in very accelerated fashion as compared to the practices of the industry, namely, in around 11 minutes instead of 20 to 50 minutes at present, which is made possible by the unusual vacuum level achieved in the container, making possible heat exchanges in saturating vapour phase.

The cooling liquid jet(s) are preferably water jets.

Advantageously, one performs the following successive steps to cool down each container:
a) after purging the volume of air contained in the autoclave, expose each container to at least one jet of a liquid at the treatment temperature,
b) recover at least some of the liquid thus introduced into the autoclave and mix this with a cold liquid to lower the temperature of each container without causing thermal shocks liable to damage the latter,
c) repeat step b) until the temperature of each container is progressively lowered to a temperature less than the cooking temperature of the food product while monitoring in real time the pressure in the autoclave by injection of a pressurized gas flow inside the autoclave to establish a back pressure or by actuating a purge valve of the autoclave.

this method makes it possible to measure, limit and control continually the difference between the internal pressure of the container and the external pressure during all the steps of the method, and especially during the heating (sterilization, pasteurization) and cooling operations, by maintaining the pressure difference between the inside of the container and the autoclave chamber between 300 and 800 mbars as long as the temperature of the autoclave remains above 90° C., so as to prevent the opening of the container, the degradation of the structure and the qualities of the products and/or the abrupt crushing of the container, as well as to avoid the crushing of the cover seal of the container, having been softened by the heat, the method makes it possible to measure, limit and control continually the rises and drops in pressure and temperature in the container and in the atmosphere of the autoclave, so as to make all changes gradual, for example, avoiding contact between excessively cold cooling liquids and hot containers, in order to prevent the degradation of the structure and the qualities of the products and/or the abrupt crushing of the container, as well as to avoid the crushing of the cover seal of the container, having been softened by the heat.

The present invention also concerns a packaging system for the implementing of the method for packaging of a food product as described above, comprising at least:
a mixing device,
a pumping unit to evacuate the interior space of said mixing device, said pumping unit being configured to attain an absolute pressure in said mixing device less than 30 mbars, and even better between 10 and 25 mbars,
a receiving enclosure for a container and its cover, these latter being rigid, this enclosure being connected to means for reducing its pressure and comprising means of magnetic holding of the cover away from the orifice of the corresponding container to allow the escape of gases contained in this container, said enclosure being outfitted with one or more measurement sensors each one putting out measurement signals,
a sterilization autoclave outfitted with one or more measurement sensors each one putting out measurement signals, and
a central control unit receiving said measurement signals to monitor in real time physical parameters such as the pressure and the temperature, in the enclosure and/or in each container and/or in the autoclave.

Preferably, this autoclave is equipped with a shower system to direct at least one jet of a liquid onto the container after pasteurization or sterilization of its contents in order to cool it down, this autoclave comprising an assembly for introduction of a pressurized gas flow inside the autoclave to establish a back pressure and/or a remote controlled purge valve of the autoclave.

This liquid is, for example, water or another cooling liquid not able to degrade the container or the autoclave.

Advantageously, this autoclave comprises a system for recovery of at least part of the liquid introduced into the autoclave, said part being recycled at least partly to the shower system to be introduced once more into the autoclave after mixing with a liquid at a lower temperature contained in a storage tank, said system comprising at least one measurement device to measure the flow rate and the temperature of the liquid so recovered in order to determine the volume of liquid to be reinjected at a lower temperature.

It will be noted that it is the synergy:
between the means of preliminary evacuation needed to carry out step b) described above, whose efficacy on the product requires a sufficiently long time for the evacuation, i.e., in a specific vacuum mixing device and with the necessary ingredients, so that the product has had time to have its air evacuated and so that its cavities are flattened or filled, and the means needed in the other steps of the above-described method, whose sequencing in the industry, container by container, would not allow one to obtain a sufficiently low pressure during the allotted time at a reasonable price, as the experiments have shown, which makes it possible to produce the desired and durable industrial low pressure conditions in the closed container afterwards, improve the outgassing, improve the qualities of the products and lengthen the period of preservation, these being inseparable because:

on the one hand, in an ordinary container or in a container under insufficient vacuum, the pressure attained during the sterilization is greater than in a container under deep vacuum, which causes a greater degradation of nutrients and organoleptic qualities of the food (pressure cooking);

on the other hand, it is the low pressure obtained by the combining of the first outgassing (step b) and the second (step c) which guarantees that the heat exchanges between the inside of the container and the outside can occur more slowly in the vicinity of the boiling point of water, that is, at accelerated rate, by utilizing the latent heat of phase change, it is likewise said low pressure obtained by said combination of means which makes it possible to totally eliminate the covering liquids, supposed to protect the foods from the oxidizing effect of oxygen, this elimination of covering liquids thus likewise reducing the mass to be heated and cooled in the containers by around half, it is likewise said low pressure obtained by said combination of means which makes it possible to totally eliminate the micro air pockets inside the foods, which are responsible for zones of rancidity and organoleptic degradation inside the foods, thus improving the organoleptic qualities of said foods, and making it possible to push back the optimal use by date of the preserves, which is, as recalled, connected to the inevitable entry of oxygen into the preserves, said low pressure (obtained by said combination of means) furthermore reducing the total cooking times, in particular thanks to a reduction of the cooling down time after autoclave sterilization, which also allows an improving of the qualities of the product by reducing the degradation of flavours, colours and texture of the foods due to overcooking.

BRIEF DESCRIPTION OF THE DRAWINGS

Other advantages, purposes and particular characteristics of the present invention will emerge from the following description, for purposes of explanation and in no way limiting, with regard to the attached FIG. 1, which shows schematically a packaging system according to one particular embodiment of the present invention, and the attached FIG. 2, which shows the modification of the accelerated heating and cooling ranges, according to the advancement of the vacuum in the container, made possible in the course of technological improvements.

DETAILED DESCRIPTION OF EMBODIMENTS OF THE INVENTION

It will be noted, first of all, that the figures are not drawn to scale.

Figure 1:
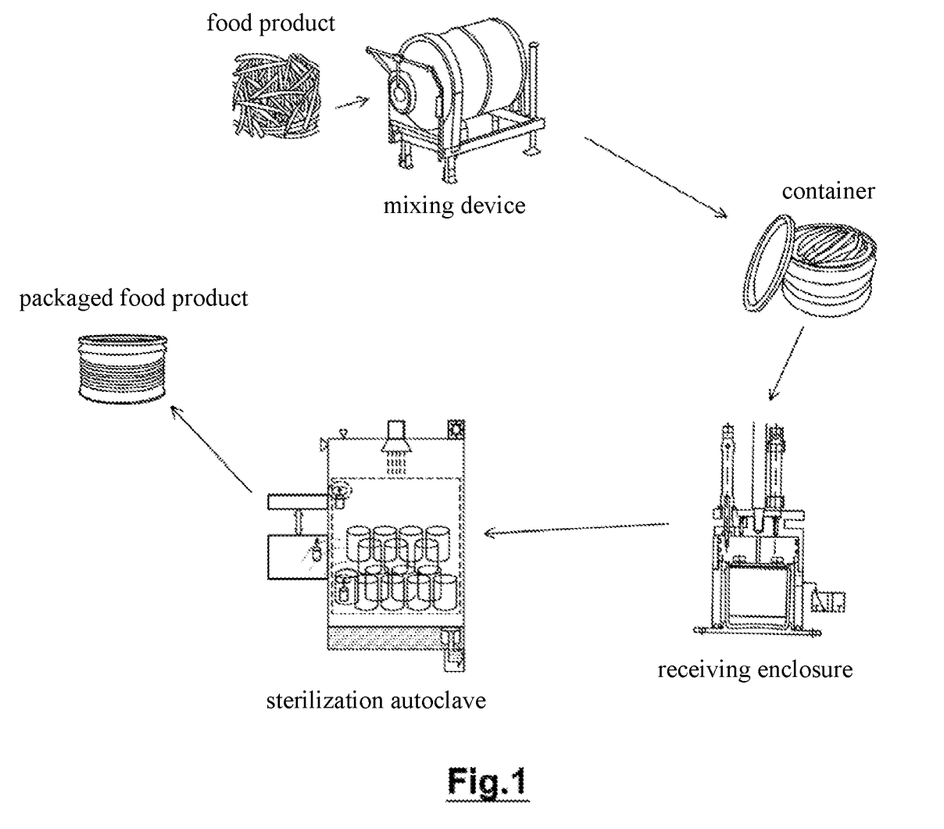

FIG. 1 shows a packaging system for the implementing of the method for packaging of a food product containing pieces according to one particular embodiment of the invention.

Figure 2:
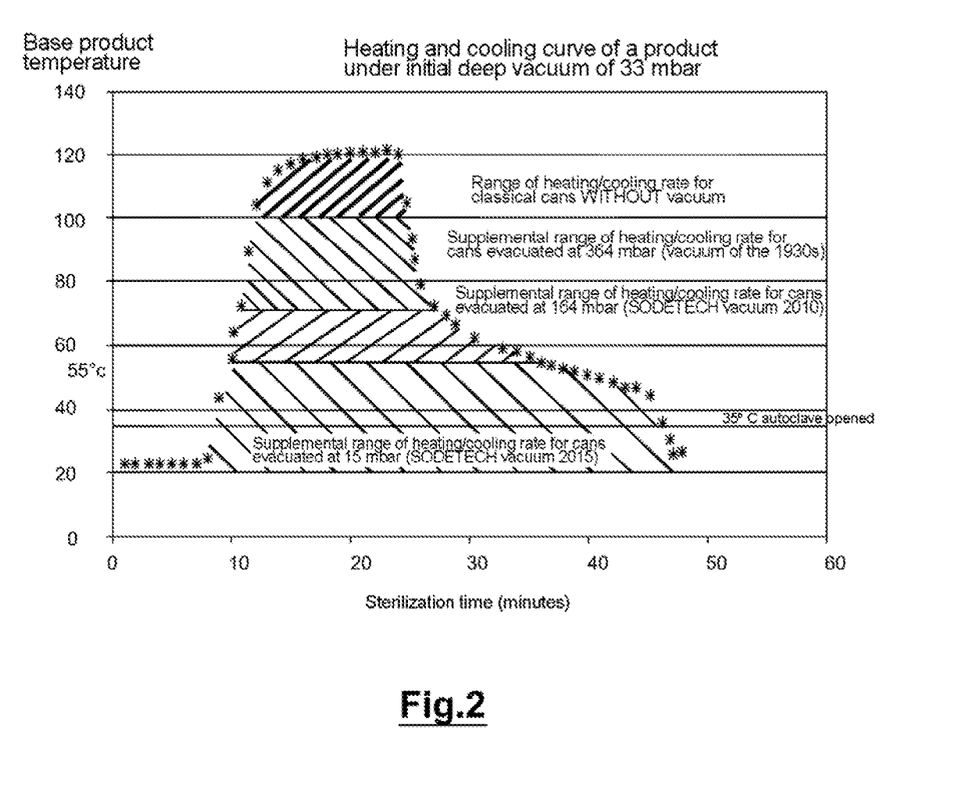

FIG. 2 shows the modification of the accelerated heating and cooling ranges, according to the advancement of the vacuum in the container, made possible in the course of technological improvements since the 1920s, a time when pumps were unable to achieve a vacuum lower than 364 mbar in containers, in which ranges it is possible to exploit the saturating vapour state inside the closed container, which state makes it possible to guarantee that all the heat exchanges inside the container occur by condensation or evaporation on the surfaces of the container or the product, which allows the transfer of 54 kcal/gram of evaporated or condensed water (latent heat of boiling/condensation). Thus, one finds that with the gain in range, and thus time, provided by the system which is the object of the present invention, one can now much more quickly leave the classical parboiling zones (37° C. to 55° C.), believed to favour the development of bacterial spores, which constitutes additional safety for semi-preserves. One can thus move up the opening of the autoclaves which generally takes place below 35° C., this making it possible to benefit from slower sterilization equipment, which constitutes a factor limiting the industrial profitability.

The proposed method adds several steps to the packaging method described in document EP 1 421 001 A1 in the name of the present applicant, consisting in the following:

(a) upstream from the step of evacuating a tight and rigid container containing a food product, in the enclosure described in document EP 1 421 001 A1, the preparing of this food product so that it is already well outgassed and flavoured, by "cold" blanching it, the operation consisting in making it undergo a cold vacuum churning in a blender, or mixing device, under high vacuum of 10-30 mbars of pressure, this preparation step being especially designed to eliminate all noncondensable gases trapped inside pieces of the food product and until no cavities remain in the product, either because they are flattened by the vacuum or because they are completely refilled with the ingredients themselves, but also to cause any additives introduced such as salts and flavours to penetrate in depth and finally to greatly reduce the bacterial burden by exploding of nonsporulated cells, making it possible to reduce afterwards the heat treatment times by pasteurization or sterilization.

(b) Still upstream from this step of evacuation of the container, adding to at least the portion of the mixture previously obtained and placed in the tight and rigid container a quantity of water well below the quantity of water usually needed to provide a covering liquid for this mixture, the quantity of water being limited here to several grams, such as 30 grams for a container of 1.5 litres containing 700 grams of green beans, the quantity needed to form a saturating vapour atmosphere enabling the heat exchanges to occur thereafter at very low pressure, and for the boiling of water to occur below 30° C., i.e., utilizing the latent heat of evaporation/condensation of the water, making it possible to speed up the heat exchanges.

(c) upstream from this evacuation step, optionally, and in particular for products which are to be cooked, installing in one or more containers of the batch intended to be packaged a set of radio transmission probes making it possible to know, by analogy in real time, the pressure and the temperature in all the containers of this batch;

(d) during the evacuation step as described in document EP 1 421 001 A1, gradually placing the enclosure 1 under a deep vacuum by attaining a pressure in each container of the batch between 10 and 30 mbars, this progressivity being dictated by the aforementioned pressure value and by the nature of the food product packaged in each container and also by the temperature of this product;

(e) during this evacuation step, monitoring and managing the gradual vacuum descent, the vacuum level, and the exposure time of the product to the vacuum with suitable means, for example, with a system of radio transmission probes for pressure and temperature, installed in one or more control cans and in the autoclave oven, these probes being connected to the central control unit provided with a computer program of digital or graphical display and, optionally, an automatic program for managing the increases and decreases of pressure and temperature;

(f) after this evacuation step, optionally, and in particular for products which are to be cooked, organizing the sterilization or pasteurization in a steam autoclave with back pressure, constantly monitoring the difference in temperature and pressure between the inside of each container and the atmosphere of the autoclave oven in which it is located, to prevent any container from opening by virtue of its internal rise in temperature and pressure or from being crushed as a result of excessive pressure in the autoclave, which is achieved by maintaining the difference in pressure between the inside of each container and the autoclave chamber between 300 and 800 mbars for as long as the temperature of the autoclave remains above 90° C., this delicate operation requiring an automated monitoring of the autoclave, making sure that at certain times, depending on the situation, it is not threatened by cavitation if one is using a pump to evacuate its ballast water;

(g) after the evacuation step, optionally, and in particular for products which are to be cooked, rapidly cooling the product in each container after pasteurization or sterilization, preferably with an autoclave whose cooling down is accomplished by a shower at gradually decreasing temperature starting from the sterilization temperature (for example, 121° C.) to attain the cooking end temperature (such as 68° C.) in less than eleven (11) minutes and, if possible, in less than three (3) minutes if one has available a modified autoclave, either with major extension of its exchange surface, or with a continual evacuation of the ballast water, by gradually lowering the pressure in the autoclave and constantly monitoring the difference in temperature and pressure between the inside of each container and the atmosphere of the autoclave oven in which it is located, to prevent any container from opening by virtue of inadequate pressure in the autoclave or from being crushed as a result of excessive pressure in the autoclave, which can be done for example with a system of radio transmission probes for pressure and temperature, installed in one or more control cans and in the autoclave oven.

It is thus possible to achieve the vacuum goal, after packaging and cooling down, with an absolute pressure of at most 50 mbars at 4° C. in the container as shown by the present invention.

A major aspect of the invention involves the carrying out of an operation of sterilization or pasteurization treatment of foods, which is done by heating of the container subsequent to its closure. It will be understood that such a treatment involves foodstuffs containing water which is needed to help create a saturating vapour atmosphere and exploit the advantages of the phase change of the water as described above.

The instantaneous boiling of the water of the products, brought about by the evacuation of the container, produces a supplemental outgassing of the food product and of the inside of the container and guarantees an environment consisting exclusively of water vapour. But the water of the products is not always enough to create enough vapour. The adding of a very limited volume of moisture is thus necessary (approximately 30 g for 700 g of green beans in a container of 1.5 litres) to ensure enough saturating vapour in the container to enable the accelerated heat transfers at the time of sterilization. As a result, the product is protected against any oxidation, whether by direct oxidation or by enzymatic oxidation, and it is not necessary to add liquid to cover it entirely, an operation which tends to commonly result in the dilution of the soluble substances contained in the product.

Under the effect of the deep vacuum (10 to 30 mbars of absolute pressure) produced in the container, the peripheral tightness seal of the cover is applied hermetically and durably by itself against the mouth of the container, owing to the bowl-like shape of the central part of the cover, which guides the cover in its movement, and owing to the cleanness of the edges of the cover and the mouth of the container, which should have a rolled rim to offer a sufficient contact surface with the cover seal, which should be provided with an annular groove into which the seal is fitted, which should be flexible enough to hug the shapes of the neck of the container and strong enough to withstand the pressure changes intrinsic to the method and the final pressure exerted after cooling down on the seal and which reach around 8 to 12 $kg/cm^2$ depending on the format of the container, to which pressure is added the pressure of full containers stacked on top during the storage and transport of the finished products.

In order to achieve the rapid cooling down proposed by the present invention, one can use an injection of water by temperature-regulated water shower, eliminating any internal recycling of the cooling down water in the autoclave, by maintaining in its ballast only a slight quantity of water and evacuating this hot water to an outside storage unit.

The temperature of the water should be modulated so that it drops gradually from the temperature of pasteurization or sterilization (for example, $T_S$=121° C.), without differing too much from the temperature of each container in order to avoid heat shocks which are liable to cause them to be crushed, so as to gradually reach a low temperature (such as around 25° C. to 30° C.) in the autoclave, the temperature of each container enabling the end of the cooking of the food product contained in the corresponding container.

It has been found that the present method makes it possible to economize on up to 90% of the quantities of water customarily used in vegetable preserving and up to 100% of the covering fats normally used in meat pickling, consequently reducing the transport weight by at least 40%.

For products which are to be cooked, this method ensures a cooling down of the food product contained in the container after pasteurization or sterilization in a time less than 50 to 75% of the time normally observed, that is, in less than 10 minutes at most, and if one has a high-capacity autoclave with heat exchange in less than 2 minutes for a cylindrical container of drum type, containing 1.5 litres with diameter of 153 mm and height of 92 mm.

The invention claimed is:

1. Method for packaging of a food product, comprising the following successive steps:
   placing a food product and one or more additives in a mixing device;
   mixing the food product and said one or more additives in the mixing device an evacuating the mixing device until an absolute pressure of less than or equal to 30 mbars is reached to provide an outgassed mixture;
   subjecting the outgassed mixture to a cold vacuum churning in the mixing device to cold blanch the outgassed mixture to provide a cold blanched mixture;
   introducing an equal portion of the cold blanched mixture from the mixing device into a plurality of rigid containers to define a batch and vacuum packaging the mixture within said plurality of rigid containers, the mixture being at a temperature less than the boiling temperature of water at a pressure used for vacuum packaging of the mixture;
   wherein vacuum packaging the mixture into said plurality of rigid containers comprises the steps of introducing one or more first measurement sensor into at least one of said rigid containers of the batch to define a control container, wherein each first measurement sensor comprise a transmitter to transmit measurements performed in the form of communication signals; and
   placing said batch in an enclosure and introducing one or more second measurement sensors into the enclosure, wherein the enclosure is connected to a pressure regulator to reduce a pressure of the enclosure, and each second measurement sensor comprises a transmitter to transmit measurements performed in the form of communication signals, so as to determine in real time a differential pressure and a temperature in each container of said batch, thereby enabling a monitoring of the packaging of said batch.

2. The method of claim 1, wherein the mixing device is a churn outfitted with an evacuating device.

3. The method of claim 1, wherein the evacuating step is carried out for a predetermined minimum time to ensure destruction of a majority of a nonsporulated bacterial burden of the food product.

4. The method of claim 1, wherein, before the evacuating step, a temperature of the food product is at a temperature greater than the boiling temperature of water.

5. The method of claim 1, wherein, at the end of the evacuating step, the mixture so formed is at the absolute pressure between 10 and 25 mbars.

6. The method of claim 1, wherein in the vacuum packaging step, after introducing the mixture portion into the plurality of rigid containers, a water-based impregnation liquid is added into each container, a quantity of the water-based impregnation liquid added is equal to a quantity required to form a saturating vapor atmosphere in each container so as to ensure heat exchanges by evaporation or condensation at the absolute pressure prevailing in each container after closure.

7. The method of claim 6, wherein the water-based impregnation liquid added represents less than fifteen percent by weight of a total weight of said each container.

8. The method of claim 7, wherein the water-based impregnation liquid added represents less than five percent by weight of a total weight of the mixture portion introduced into said each container.

9. The method of claim 1, wherein the placing of the food product and one or more additives in the mixing device comprises successive steps of introducing one or more additives into the mixing device, previously subjected to a temperature lower than +10° C. to prevent a volatilization of certain constituents of aromatic function, evacuating the mixing device to the absolute pressure less than or equal to 30 mbars and introducing the food product into the mixing device.

10. The method of claim 9, wherein the temperature to prevent volatilization of certain constituents of aromatic function of said one or more additives is between −1° C. and +5° C.

11. The method of claim 1, wherein each container is a rigid container comprising a cover having a tightness seal and wherein the vacuum packaging step further comprises the steps of:
   placing each rigid container comprising said portion and said cover in the enclosure and maintaining the cover away from an orifice of said each rigid container by a magnetic element to allow gases contained in said each rigid container to escape;
   progressively placing the enclosure under a vacuum to ensure an evacuation of said each rigid container to the absolute pressure less than or equal to 30 mbars, this progressivity being determined according to an absolute pressure value and the content of said each rigid container;
   placing the cover over an opening of said each rigid container to compress its tightness seal against the orifice of said each rigid container; and
   placing the enclosure at an atmospheric pressure and then releasing a pressure exerted on the cover, the connection between the magnetic element and the cover being broken.

12. The method of claim 1, wherein said containers comprise a cover and wherein the vacuum packaging step further comprises the steps of:
   hermetically closing said each container with a cover by reducing the pressure;
   bringing the content of said each container up to a heat treatment temperature greater than or equal to a threshold temperature of pasteurization or sterilization for an exposure time while continually checking the temperature and the pressure prevailing in said control container, and a pressure around said control container, so as to prevent any early opening thereof during the heat treatment and any degradation of a structure of the mixture portion contained in said each container;
   cooling the contents of said each at least one container to a temperature below a cooking temperature of the food product.

13. The method of claim 12, wherein the cooling step exposes said each container to at least one jet of a liquid.

14. The method of claim 13, wherein the cooling step exposes said each container to said at least one jet of the liquid immediately at the end of the exposure time.

15. The method of claim 12, wherein the cooling step comprises the steps of:
   placing said each container in an autoclave;
   purging a volume of air contained in the autoclave and exposing said each container to at least one jet of a liquid at the heat treatment temperature;
   recovering at least some of the liquid introduced into the autoclave and mixing the recovered liquid with a cold liquid to lower the temperature of said each container without causing thermal shocks that will damage said each container; and repeating the recovering step until the temperature of said each container is progressively lowered to a temperature less than the cooking temperature of the food product while monitoring in real time the pressure in the autoclave by injection of a pressurized gas flow inside the autoclave to establish a back pressure or by actuating a purge valve of the autoclave.

* * * * *